Jan. 20, 1953
J. B. SEBOK ET AL
2,626,009
AIR CLEANER, INTAKE SILENCER, AND
CARBURETOR HOUSING UNIT
Filed April 11, 1950
3 Sheets-Sheet 1
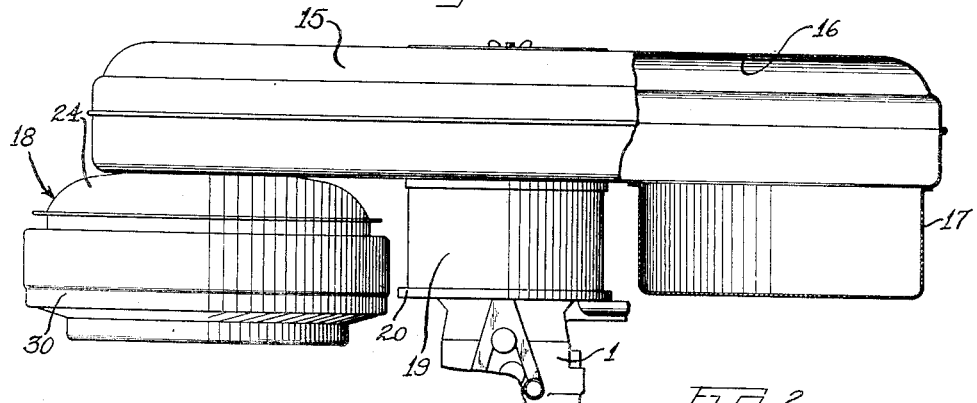
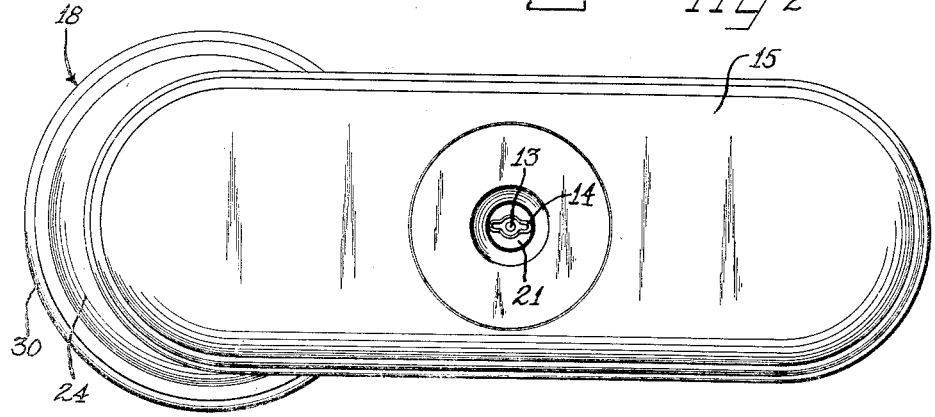
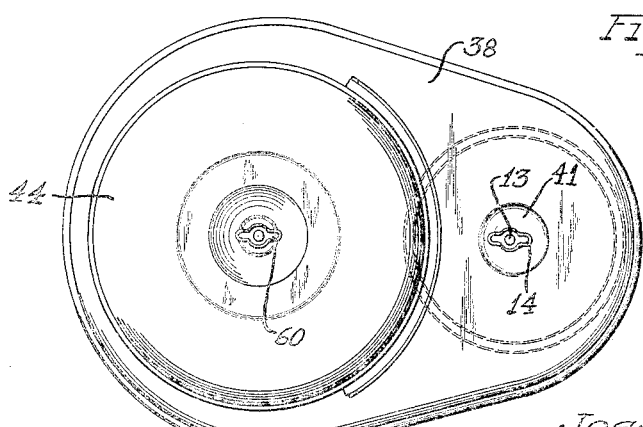
Inventor
Joseph B. Sebok
Frank Sebok Jan. 20, 1953
J. B. SEBOK ET AL
2,626,009
AIR CLEANER, INTAKE SILENCER, AND
CARBURETOR HOUSING UNIT
Filed April 11, 1950
3 Sheets-Sheet 2
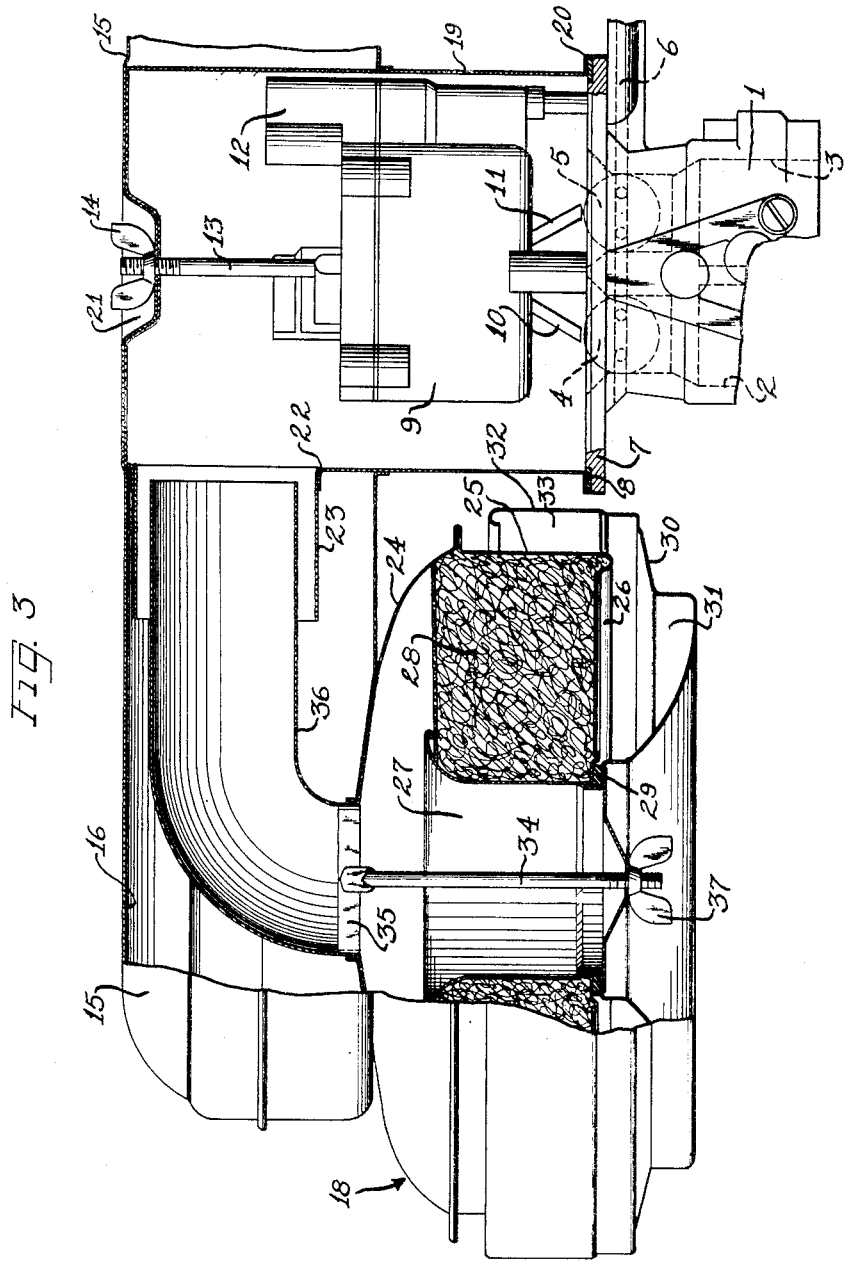
Inventor
Joseph B. Sebok
Frank Sebok
By The Firm of Charles W. Hills Attys

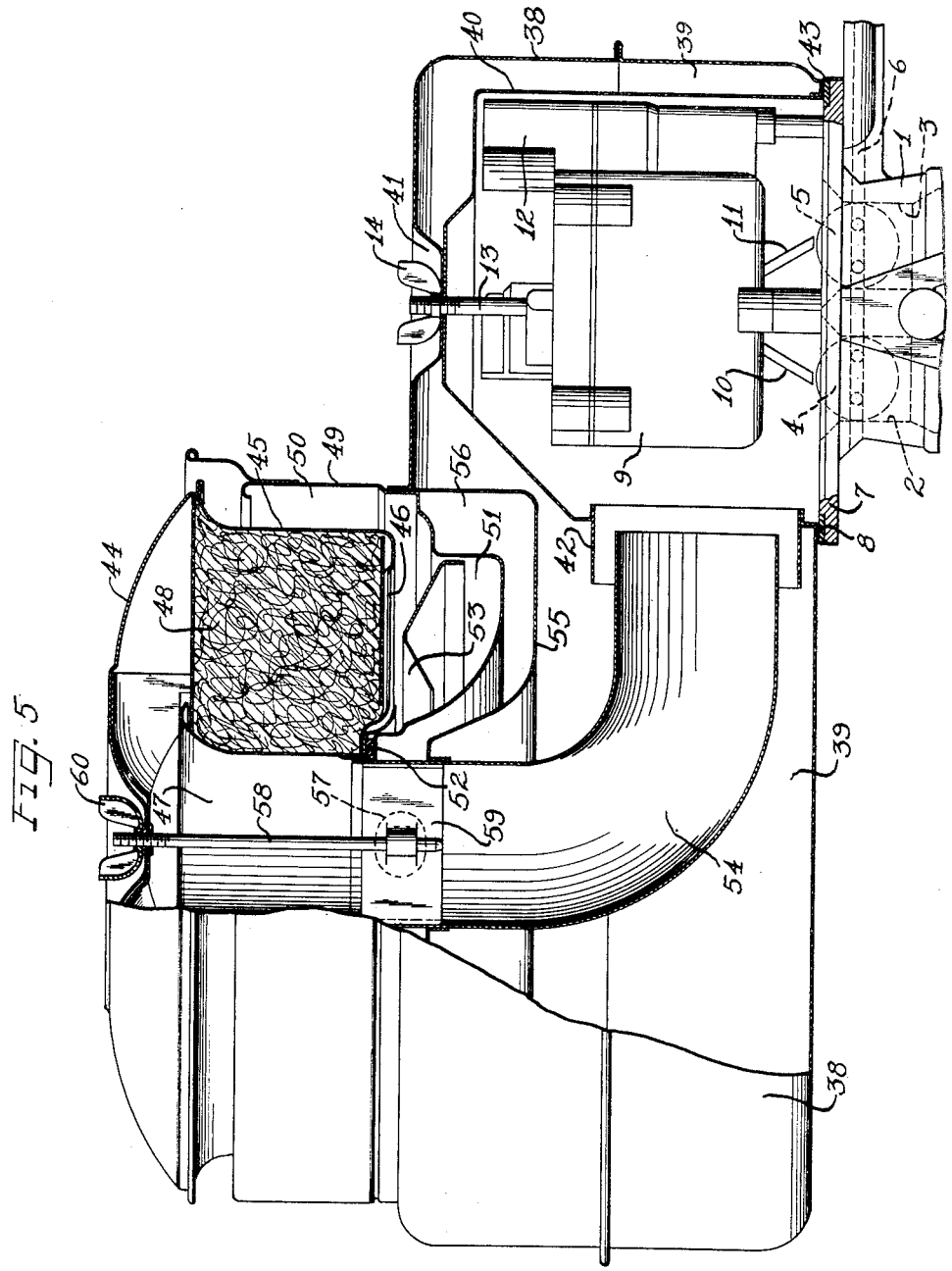

Patented Jan. 20, 1953

2,626,009

UNITED STATES PATENT OFFICE 2,626,009

AIR CLEANER, INTAKE SILENCER, AND CARBURETOR HOUSING UNIT

Joseph B. Sebok and Frank Sebok, Detroit, Mich., assignors to Houdaille-Hershey Corporation, Detroit, Mich., a corporation of Michigan Application April 11, 1950, Serial No. 155,162

3 Claims. (Cl. 183—15)

This invention relates to improvements in air cleaner, intake silencer and carburetor housing units, highly desirable for use in association with the carburetor of an internal combustion engine of the automotive type, although the invention will have other uses and purposes as will be apparent to one skilled in the art.

Difficulty has been experienced in the past in locating adequate air cleansing and intake silencing equipment beneath the hood of an automobile, especially in reasonable proximity to the carburetor. Such difficulty was occasioned in the main by the lack of space between the carburetor and the hood of the automobile, and in future designs this space will be materially lessened. As has been done in certain instances in the past, the cleaning and silencing mechanism, or one or the other, were disposed in a relatively remote location to the carburetor and a connecting tube run over from the remote location to the intake horn of the carburetor. Such arrangement is objectionable owing to the distance traveled by the air entering the carburetor, and especially owing to the fact that noises emanating from the engine in passing through the carburetor in the form of sound waves travel an objectionable distance, become spread, and in many cases amplified, so that the sound attenuating mechanism does not function to desired efficiency. Obviously, the mounting of this apparatus in various locations beneath the hood gave an appearance of cumbersomeness, and it has been objectionably large by necessity because of the volume required in the attenuating chamber or chambers, which volume was only obtained by a lateral spreading of the apparatus, owing to the lack of vertical space above the carburetor.

With the foregoing throughts in mind, it is an important object of the instant invention to provide an air cleansing and intake silencing unit which also functions as a housing for the carburetor, and completely eliminates the need of the previously utilized heavy cast carburetor housing, the air intake horn and the clamping means for connecting the clean air delivery tube to the carburetor horn.

It is also an object of this invention to provide an air cleaning, intake silencing and carburetor housing unit which is very simply attached to a carburetor, especially a downdraft carburetor, and which need project above the carburetor no further than the formerly used housing of the carburetor itself.

A further feature of the invention resides in the provision of air cleaning, intake silencing and carburetor housing means arranged in one complete unit which occupies space on opposite sides of a caburetor but extends only an absolute minimum distance above the top of the carburetor.

Another feature of the invention is the provision of a unitary structure embodying air cleansing, intake silencing and carburetor housing means, and wherein no part of the unit need project above the carburetor housing portion thereof.

A still further feature of the invention resides in the provision of a unitary structure embodying air cleaning, intake silencing and carburetor housing means, and wherein a silencer chamber may completely surround the carburetor housing portion of the structure, so that the overall height above the carburetor is reduced to an optimum amount.

Also a feature of the invention resides in the provision of a combination intake silencing and carburetor housing unit, wherein a silencing chamber is made in elongated style to decrease the height thereof.

Still another object of the invention resides in the provision of a unit embodying air cleaning, intake silencing and carburetor housing means, and wherein the carburetor housing portion of the structure and the air cleaning portion of the structure are connected by a casing defining a silencing chamber.

It is still a further object of the invention to provide a combination unit of the character herein set forth, wherein the silencing capacity may be increased or reduced without adding to the height of the unit above the carburetor, and without necessitating any material increase in expenditure for dies and similar equipment to manufacture the unit as changed.

While some of the more salient features, characteristics and advantages of the instant invention have been above pointed out, others will become apparent from the following disclosures taken in conjunction with the accompanying drawings, in which—

Figure 1 is a fragmentary side elevational view of an air cleaning, intake silencing and carburetor housing unit embodying principles of the instant invention, showing the same operatively connected to a carburetor of the downdraft type, the illustration having parts broken away;

Figure 2 is a top plan view of the structure of Fig. 1;

Figure 3 is an enlarged fragmentary part central vertical sectional and part elevational view of the structure of Figs. 1 and 2;

Figure 4 is a top plan view of an air cleaning, intake silencing and carburetor housing unit of somewhat different construction, but also embodying principles of the instant invention; and Figure 5 is an enlarged fragmentary part central vertical sectional and part elevational view of the structure of Fig. 4.

As shown on the drawings:

Both illustrated embodiments of the instant invention are shown associated with a carburetor of the downdraft type, and the carburetor selected for illustrative purposes is of a type which may well be utilized to supply a V-8 automobile engine with a combustible fuel mixture. Such carburetor, of course, includes dual choke valves, throttle valves, and mixing chambers, one portion of the carburetor supplying certain of the cylinders while the other portion supplies the remainder. It should be definitely understood, however, that the instant invention is not limited to association with the carburetor of this particular character, but may equally as well be utilized in conjunction with a carburetor having only a single choke valve, throttle valve, and mixing chamber, as well as other types of carburetors.

The carburetor will be herein described only briefly, and is illustrated rather diagrammatically, only the parts salient to the proper presentation of the instant invention being disclosed. The illustrated form of carburetor embodies a base portion 1 which may be connected with an internal combustion engine in a known manner. This base portion contains a pair of oppositely disposed mixing chambers 2 and 3 from which the combustible fuel mixture is discharged to opposite sides of the engine, the discharge of the fuel mixture being controlled by the well known throttle valves, not illustrated in the drawings. The entrance of the liquid fuel and air into the mixing chambers 2 and 3 is through a pair of ports controlled by choke valves 4 and 5, respectively, both valves being connected to an actuating shaft 6 for simultaneous movement either manually or automatically as may be desired.

Adjacent the ports controlled by the choke valves 4 and 5 the carburetor is provided with a base platform extending outwardly in the form of a supporting flange 7 annularly recessed to provide a seat for a gasket 8. Above the platform is a structure 9 housing the customary float chamber from which liquid fuel is discharged to the mixing chambers 2 and 3 by way of fuel pipes 10 and 11, respectively. Adjacent the float chamber structure is another structure 12 containing the usual accelerating pump. These structures 9 and 12 are mounted on the flange or platform 7 by the usual posts, shown but not described herein. Projecting upwardly, preferably from the float chamber casing, is an attaching bolt 13, the outer end of which is threaded to accommodate a wing nut 14 or equivalent securing means. By way of this attaching bolt and wing nut the air cleaning, intake silencing and carburetor housing unit are connected directly with the carburetor, and it may well be here noted that this single bolt is all the operable connecting mechanism required for that purpose.

Obviously, owing to the exposed discharge of raw fuel through the pipes 10 and 11, and the circulation of air therearound, it is necessary to house that portion of the carburetor above the supporting flange 7. Heretofore that has been done by a cast metal housing secured to the lower portion of the carburetor by a number of bolts. Such structure is eliminated by way of the instant invention which provides adequate housing for the carburetor.

In that illustrated embodiment of this invention seen in Figs. 1, 2 and 3, there is shown an elongated and somewhat flat casing 15 which houses a sound attenuating chamber 16. Adjacent one end thereof, the casing is provided with a depending cup-like section 17 in interior open communication with the chamber 16 so as to add volume to that chamber. Thus a large resonating chamber is provided for the attenuation of the fundamental tone emanating in an engine with which the device is associated.

From the structure as viewed in Fig. 1, it will be noted that the size of the cup-like element 17 may be varied substantially at will, either increased or decreased, without affecting in any way the manufacture of the casing 15. Thus, if it is desired to enlarge or reduce the silencing chamber to fit the entire unit to another engine, it is not necessary to employ or provide new and expensive dies and alter the manufacturing operations in order to effect the necessary change in size of the attenuating chamber.

Adjacent the other end thereof, the casing 15 is fixedly connected with the upper portion of an air cleaner generally indicated by numeral 18.

In an intermediate portion thereof, a sheet metal casing 19 is inserted in and depends from the casing 15. This casing 19 functions as a housing for the carburetor. At the lower open end thereof, there is a marginal outwardly and downwardly stepped flange 20 which embraces and seats over the aforesaid supporting flange 7 on the carburetor, the horizontal portion of the flange 20 bearing against the gasket 8 to effect an airtight closure. It is not essential that the flange exactly fit the supporting flange 7 on the carburetor, since the seal is effected by the flange 20 abutting the gasket 8. As seen best in Fig. 3, the top of the housing portion 19 abuts the inner face of the top of the casing 15, and both are recessed as indicated at 21 to provide a seat for the wing nut 14, the recessed portion having an aperture therein through which the upper end of the attaching bolt 13 may project.

On one side thereof, the housing portion 19 is provided with an aperture 22 to establish open communication with the attenuating chamber 16. Preferably a tuning tube 23 is affixed in the opening 22, the length of this tube determining the tuning of the silencing chamber; that is, a longer or shorter tube 23 may be utilized to obtain the optimum silencing effect. It will be noted that full communication with the entire chamber 16 including that part defined by the cup-like element 17 is established by way of the tuning tube 23, since as seen clearly from the showing in Fig. 2, the chamber entirely surrounds the upper portion of the housing 19.

The air cleaner 18 may be of any desired character, but, as illustrated by way of example, is of the liquid bath type. This air cleaner comprises a cover 24 affixed to the bottom of the casing 15, and the lower portion of the cover is lock seamed to a filter holding shell including an outer wall 25, an apertured bottom 26, and an inner wall 27. Such a shell holds a filter mass 28 of any suitable material, such as cattle tail hair, vegetable fiber, wavy wire, etc. Near the inner bottom portion the shell is formed to provide a seat for a gasket 29.

The air cleaner also embodies a removable liquid cup 30 which defines a sump 31 for cleansing liquid and which is provided with an upstanding wall 32 spaced from the adjacent shell wall 25 to provide an annular inlet passage 33 for dirty air. The liquid cup is held in position by means of a bolt 34 having its inner end secured to a Z bar 35 fixed to the inside of a clean air outlet conduit 36 which extends through the casing 15 in elbow fashion and preferably terminates inside the aforesaid silencing tube 23, adjacent the opening 22 in the wall of the housing 19. The lower end of the bolt 34 extends through the bottom of the liquid cup 30 and by means of a wing nut 37 or the equivalent, the bottom may be firmly attached to the bolt with a portion thereof seating in airtight manner against the gasket 29.

In view of this structure, it will be noted that the air cleaner may be serviced to the extent of removing the dirt and replacing the cleansing liquid such as oil, by the simple expedient of removing wing nut 37 and dropping off the liquid cup 30. There is no need whatever to disengage any other part of the unit from the carburetor in order to accomplish servicing of the air cleaner.

In operation, the instant invention is very simple and effective. It is only necessary to mount the unit over the carburetor by means of the bolt 13 and wing nut 14, and it will be noted that when so mounted everything is ready for operation, and no part of the unit projects above the carburetor housing portion 19 thereof. A part of the attenuating chamber structure and the air cleaner are disposed on opposite sides of the carburetor where room is generally available beneath the hood of an automobile. Due to suction created in the engine, air enters the inlet passage 33, commingles with the liquid in the sump 31, passes upwardly through the filter mass, and clean air exits through the outlet conduit 36 into the housing 19 where it may mix with the liquid fuel discharged through the pipes 10 and 11. At the same time, the predominant sound waves emanating from the engine through the choke valve control ports of the carburetor, are almost immediately attenuated by the resonator chamber 16, with which communication is had through the tuning tube 23. It will be especially noted that should there not be as much room available over the carburetor as is utilized by the illustrated embodiment of the instant invention, the housing portion 19 may be shortened until the top thereof is immediately adjacent the upper end of the accelerating pump structure 12. This will result merely in lowering the remainder of the structure a certain extent, and it is at once apparent that no portion of the strucure need be more than a fraction of an inch above the highest part of the carburetor mechanism.

In that embodiment of the invention illustrated in Figs. 4 and 5, we have shown a structure which, while not as versatile as to changes in size of the attenuating chamber for the fundamental tone, and which may not in its entirety be disposed as low as that above described, nevertheless discloses a structure wherein the carburetor housing portion and the air cleaning portion is joined by a unitary silencer casing, and an added attenuating chamber is provided.

In this embodiment of the invention, there is shown a casing 38 of generally ovate contour, housing a silencing chamber 39 of relatively large volume for attenuating the fundamental low frequency sound emanating from the engine. As seen clearly in Fig. 5, the attenuating chamber 39 completely surrounds a carburetor housing 40, and the top of the casing 38 is recessed as at 41 to abut the top of the housing 40 and provide a seat for the attaching wing nut 14, the two abutting surfaces being apertured to permit projectioning therethrough of the bolt 13 attached to the carburetor. Access is provided to the attenuating chamber 39 for sound waves by way of a tuning tube 42 secured in the wall of the housing 40.

The housing 40, of course, is preferably spot welded, brazed or equivalently secured to the casing 38 at points of contact, as are the various other portions of the complete unit, except for the removable section of the air cleaner. At the lower part thereof, flange 43 is associated with the housing 40 for engagement with the gasket 8 on the carburetor supporting flange 7 in the same manner as above described in connection with the flange 20.

In this instance, the separable section of the air cleaner embodies the filter holding part, while the liquid sump is secured to the casing 38. The air cleaner is of the same general construction and operation as above described, and the removable section thereof includes the cover 44, a filter holding shell including an outer wall 45, an apertured bottom 46, and an inner wall 47 which also functions as a part of the outlet conduit for clean air in this particular construction. Inside the shell is a filter mass 48 of the same character as the the mass 28 above discussed.

The lower portion of the air cleaner includes a cup-like member 49 secured to the silencer casing 38, sized to define an annular air inlet passage 50, and shaped in its bottom to define a sump 51 for cleansing liquid. In its inner portion this member 49 is also shaped to provide a seat for a gasket 52 against which the inner part of the filter holding shell may abut when the sections of the cleaner are united. If so desired, a baffle 53 may also be incorporated in the air cleaner structure to control the amount of sump liquid carried into the filter mass by traveling air.

An outlet tube or conduit 54, generally of elbow shape, is provided for the discharge of clean air, and the lower end of this tube terminates inside the aforesaid tuning tube 42 so that clean air is discharged substantially directly into the carburetor housing 40. This outlet tube is secured to the inner flange portion of the cup-like member 49.

Another partition secured to the outlet tube on its inner part and to the casing 38 on its outer margin, designated by numeral 55, defines an attenuating chamber 56 of relatively small volume for the attenuation of high frequency sounds, and communication to this chamber is had by way of one or more openings 57 through the wall of the clean air outlet conduit 54.

The two sections of the air cleaner are held in assembled relationship by means of a bolt 58 having its lower end affixed to a Z bar 59 in the outlet conduit 54, and the upper end of which extends through a suitable aperture in the top 44 of the air cleaner structure, where it may be externally engaged by a wing nut 60 or the equivalent.

In operation, the structure of Figs. 4 and 5 is substantially the same as that of Figs. 1, 2 and 3, in that air will enter the path 50, commingle with sump liquid, pass upwardly through the filter mass 48, and descends the inner part of the filter holding shell 47 and outlet tube 54, discharging into the carburetor housing 40. At the same time, sound waves emanating from the engine through the choke valve controlled ports may enter the low frequency attenuating chamber 39 through the tuning tube 42, while high frequency sound waves may enter the other attenuating chamber 56 through the opening 57.

It will be understood that modifications and variations may be effected without departing from the scope of the novel concepts of the present invention.

We claim as our invention:

1. In an air cleaning, intake silencing and carburetor housing unit, an elongated casing housing a sound attenuating chamber, air cleaning means depending from one end of said casing, hollow means depending from the other end of said casing to increase the size of said chamber, carburetor housing means depending from an intermediate part of said casing, said housing means having an opening in the wall thereof, and a tuning tube secured in said opening and extending into said chamber.

2. In an air cleaning, intake silencing and carburetor housing unit, an elongated casing housing a sound attenuating chamber, air cleaning means depending from one end of said casing, hollow means depending from the other end of said casing to increase the size of said chamber, carburetor housing means depending from an intermediate part of said casing, said housing means having an opening in the wall thereof, a tuning tube secured in said opening and extending into said chamber, and an outlet conduit from said air cleaning means having its discharge end terminating in said tuning tube.

3. In an air cleaning, intake silencing and carburetor housing unit, an elongated casing of greater width than depth and defining an interior sound attenuating chamber, air cleaning means connected to the underside of one end of said casing, a carburetor housing connected to an intermediate part of said casing and having an opening communicating with said chamber and said air cleaning means, the top of said housing contacting the inner face of the top of said casing and no other part of the unit extending thereabove.

JOSEPH B. SEBOK.
FRANK SEBOK.

REFERENCES CITED

The following references are of record in the file of this patent:

UNITED STATES PATENTS

| Number | Name | Date |
|---|---|---|
| 2,310,528 | Kamrath | Feb. 9, 1943 |

FOREIGN PATENTS

| Number | Country | Date |
|---|---|---|
| 502,637 | France | Feb. 26, 1920 |
| 880,587 | France | Jan. 4, 1943 |